United States Patent [19]

Wan

[11] Patent Number: 4,958,227

[45] Date of Patent: Sep. 18, 1990

[54] SYSTEM FOR PROVIDING CONTROL SIGNALS FOR RASTER SCAN DISPLAYS

[75] Inventor: Gary Wan, Waldwick, N.J.

[73] Assignee: Allied-Signal Inc., Morris Township, Morris County, N.J.

[21] Appl. No.: 380,413

[22] Filed: Jul. 17, 1989

[51] Int. Cl.$^5$ .......................... H04N 5/04; H04N 5/06
[52] U.S. Cl. ..................................... 358/148; 358/150; 340/814
[58] Field of Search ....................... 358/148, 150, 152; 340/814

[56] References Cited

U.S. PATENT DOCUMENTS

| | | | |
|---|---|---|---|
| 4,012,592 | 3/1977 | Richard | 358/150 |
| 4,196,431 | 4/1980 | Lee | 340/814 |
| 4,316,219 | 2/1982 | Smith et al. | 358/150 |
| 4,412,250 | 10/1983 | Smith | 358/150 |
| 4,518,995 | 5/1985 | Harshbarger et al. | 358/150 |
| 4,563,676 | 1/1986 | Leininger | 358/150 |
| 4,616,260 | 10/1986 | Erwin et al. | 358/150 |
| 4,670,782 | 6/1987 | Harshbarger et al. | 358/150 |

Primary Examiner—John W. Shepperd
Assistant Examiner—Michael D. Parker
Attorney, Agent, or Firm—Glen M. Diehl; Howard G. Massung

[57] ABSTRACT

A system for providing control signals for raster scan displays includes a horizontal timing random access memory and a vertical state random access memory arranged in a presettable counter configuration containing multiple levels of information. This approach allows the generation of the control signals in a sychronized relationship using a common counter arrangement so as to obviate the need for repetitive circuitry and without compromising performance.

16 Claims, 1 Drawing Sheet

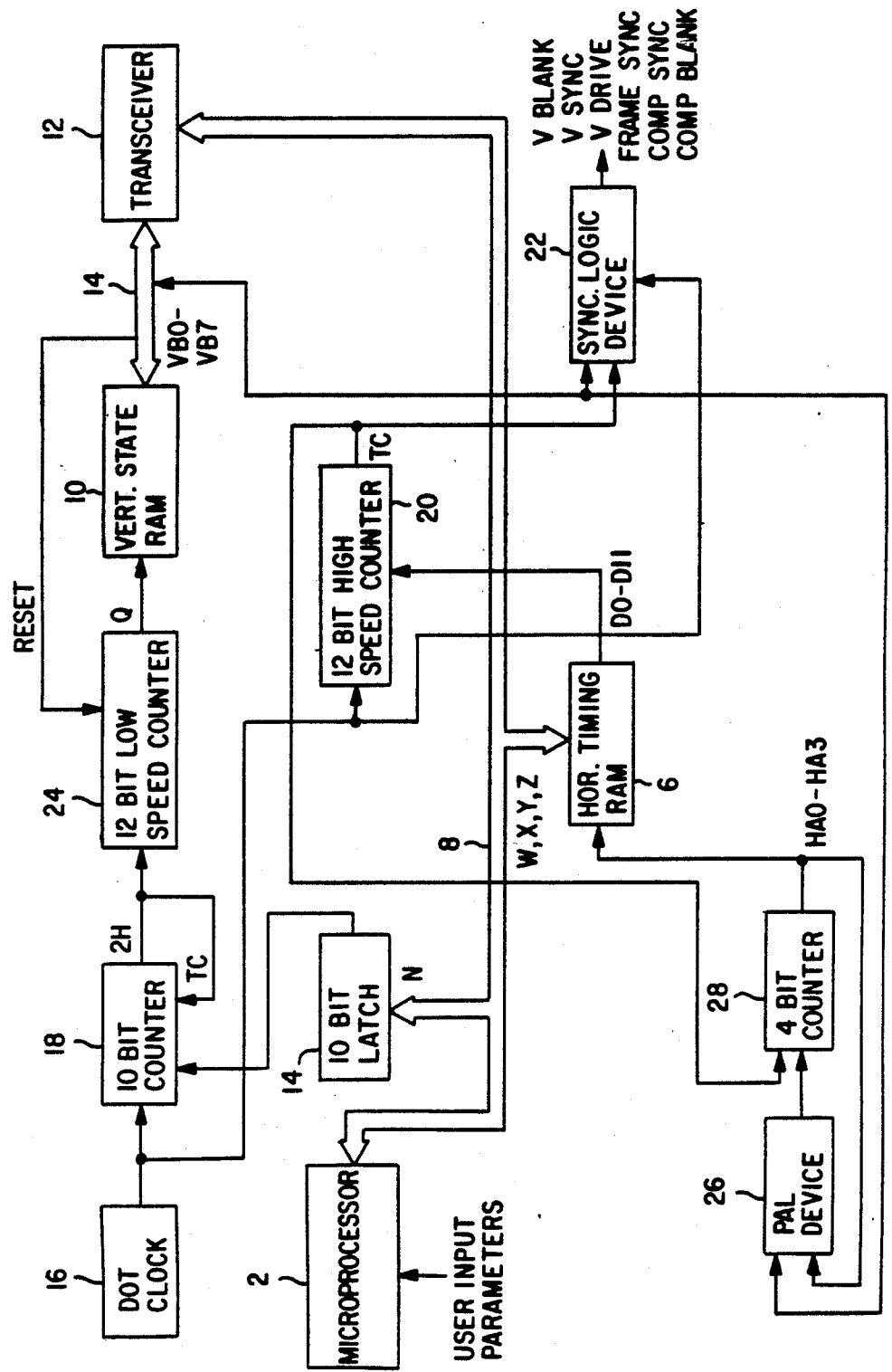

SYSTEM FOR PROVIDING CONTROL SIGNALS FOR RASTER SCAN DISPLAYS

BACKGROUND OF THE INVENTION

This invention relates to a microprocessor based system for providing video control signals. Systems of this type feature a DOT (pixel) clock. The timing of control signals such as, for example, frame synchronization, vertical drive, vertical synchronization, vertical blank, composite synchronization and composite blank signals, is user specified and programmable. These signals are used to synchronize external equipment and/or to generate analog composite video signals for testing a cathode ray tube (CRT) display.

Input parameters in the system are dictated by particular requirements and may include: vertical synchronization/frequency; the number of horizontal periods per field; the width of a horizontal front porch; the width of horizontal synchronization; the width of a horizontal back porch; the number of active pixels (dots) per horizontal period; and the total number of pixels (dots) per horizontal period. These parameters determine the output frequency requirements of the DOT (pixel) clock used in the system and referred to above.

The present invention provides the desired results without the need for repetitive circuitry as has heretofore been the case, and without compromising system performance which is desirable.

SUMMARY OF THE INVENTION

This invention contemplates a system for providing control signals for raster scan displays, featuring a horizontal timing random access memory (RAM) and a vertical state random access memory (RAM) controlled by a microprocessor. The horizontal timing RAM is arranged in a presettable counter-configuration and stores multiple levels of information so as to provide signals at different times via a common counter arrangement. The vertical state RAM contains the logical "image" of vertical field signal information. The two RAMs are arranged in a configuration which provides the control signals.

BRIEF DESCRIPTION OF THE DRAWING

The single FIGURE in the drawing is a block diagram of a system according to the invention.

DETAILED DESCRIPTION OF THE INVENTION

With the system of the invention in a static mode, a microprocessor 2 accesses a 10-bit latch 4 and a horizontal timing random access memory (RAM) 6 via an input/output bus 8. Microprocessor 2 accesses a vertical stat random access memory 10 via input/output bus 8, a transceiver 12 and an input/output bus 14.

User input parameters to microprocessor 2, determined by particular system requirements, are: vertical synchronization frequency/period (VSYNC); the number of horizontal periods per field (H); the width of a horizontal front porch (HFP); the width of horizontal synchronization (HSYNC); the width of a horizontal back porch (HBP); and the number of active dots (pixels) per horizontal period (ACTPIX). The total number of dots per horizontal period (TDOT) is derived from the aforenoted parameters. These parameters determine the selected output frequency of a DOT clock 16. DOT clock 16 may be of the type derived from either a crystal oscillator or from a phase-locked loop circuit. After all necessary parameters are loaded, microprocessor 2 renders the system in a dynamic mode.

DOT clock 16 is connected to a 10-bit timer/counter 18, to a 12-bit high speed counter 20 and to a synchronizing logic device 22.

Counter 18 is connected to a 12-bit low speed vertical RAM address counter 24. The output of counter 18 is fed back thereto for purposes to be hereinafter described. Counter 24 is connected to vertical state RAM 10. Latch 4 is connected to counter 18. Bus 14 is connected to counter 24 via a reset line.

A programmable array logic device (PAL) 26 is connected to a 4-bit horizontal RAM address counter 28. Counter 28 is connected to horizontal timing RAM 6. Horizontal timing RAM 6 is connected to counter 20 and counter 20 is connected to counter 28.

Counter 20 is connected to synchronizing logic device 22. PAL device 26 is connected in input/output configuration to synchronizing logic device 22 and to bus 14. The output of counter 28 is fed back to PAL device 26.

Output signals are provided by synchronizing logic device 22 and include: vertical blank (VBLANK); vertical synchronization (VSYNC); vertical drive (VDRIVE); frame synchronization (FRAME SYNC); composite synchronization (COMP SYNC); and composite blank (COMP BLANK) signals.

OPERATION OF THE INVENTION

With the aforenoted component connections in mind as heretofore described, it will be understood that the system is configured in static and dynamic modes. Initially the system is in a static mode whereby microprocessor 2 accesses latch 4, vertical state RAM 10 and horizontal timing RAM 6. After all necessary information is loaded into the system, microprocessor 2 configures the system in a dynamic mode.

In the static mode a binary number N, derived from TDOT/2, is outputted by microprocessor 2 to latch 4. In the dynamic mode counter 18 increments N counts to provide a 2H output based on the frequency of the output of DOT clock 16. When counter 18 reaches a terminal count TC, the output thereof is fed back to the counter so that the counter reloads itself to the binary number N. This sequentially occurs in a continuous loop configuration, providing a reference 2H clock as required by counter 24.

In the static mode, microprocessor 2 loads RAM 10 via transceiver 12 with a "logical" image of the vertical field signal information. Each data bit from vertical state RAM 10 (VB0-VB7) contains particular vertical field information. For example, four data bits, VB0 to VB3 are used to derive VBLANK, VSYNC, VDRIVE and FRAME SYNC signals. The number of horizontal periods per field dictates the number of required locations/addresses of vertical state RAM 10. For purposes of illustration, 262.5 lines/field, which is a 525 lines/frame interlaced system, requires 525 vertical state RAM 10 locations.

Data within vertical state RAM 10 guides the sequence of counter 28 via PAL device 26, based on the aforenoted VB0-VB3 information. In the dynamic mode the Q output of counter 24 will automatically sequence through the memory locations of RAM 10 in half-line timing increments.

In the static mode microprocessor 2 loads the memory locations of horizontal timing RAM 6 with binary counts W, X, Y and Z. These counts represent the number of cycles of DOT clock 16 necessary to provide proper user requested HFP, HSYNC, HBP and ACT-PIX parameters, respectively. The accuracy of the number entered into RAM 6 can be dynamically verified against the calculated number by microprocessor 2.

As aforenoted, with all the information loaded as described, the system is configured in a dynamic mode. In the dynamic mode, VB0–VB3 from RAM 10 monitor which particular horizontal line is being sequenced, and guide the sequence of counter 28 through PAL device 26. Counter 28, in turn, insures that proper address data is being applied to counter 20.

PAL device 26 reduces combination logic and decodes branch conditions that require a change to the normal sequence of counter 28. The decoding is based on a combination of information supplied by VB0–VB3 which contains vertical line information, and from HA0 to HA3 outputs from counter 28 which contains the present address of RAM 6.

The RAM address HA0 to HA3 generated by counter 28 determines what input binary data D0–D11 is applied to counter 20. This sequence of binary input data provides a high speed, presettable, multi-level counter/timer circuit. Each set of data applied to counter 20 eventually reaches a terminal count TC of counter 20, and thereby indicates to counter 28 when to increment to the next location/address of RAM 6. This sequence continues until the output of vertical state RAM 10 indicates that the end of the second field has been reached. At that time, counter 24 is reset and the aforenoted sequence reoccurs.

Synchronizing logic device 22 can be implemented using conventional synchronous logic or programmable array logic (PAL). Output control signals VBLANK, VSYNC, VDRIVE and FRAME SYNC which actually are the outputs of RAM 10 are taken directly from VB0 to VB3. Output control signal COMP SYNC is provided using synchronous logic based on VSYNC and horizontal timing generated by counter 20. The remaining output signal COMP BLANK is derived similarly from VBLANK and the horizontal timing of counter 20.

It will now be understood that the invention herein described is a microprocessor based raster video control signal generating system. A DOT clock is employed and the actual timing of output signals is user specified and programmable, and may be used for synchronizing external equipment and/or generating analog composite video signals for testing a CRT display monitor. System parameters are inputted based on a selected frequency of the DOT clock output.

It is to be understood that the several components herein referred to are commercially available in the form of microchip or microcircuit configuration. The novelty of the invention resides in the arrangement of the components and not in the components themselves.

With the above description of the invention in mind reference is made to the claims appended hereto for a definition of the scope of the invention.

What is claimed is:

1. A system accessed by a processor means in response to selected input parameters for providing control signals for raster scan displays, comprising:

latch means accessed by the processor means for receiving therefrom a predetermined binary number derived from the total number of dots per horizontal period of the field of a display, and for providing a corresponding signal;

clock means for providing a pulse output in cycles at a predetermined frequency;

first counter means connected to the latch means and to the clock means and responsive to the latch means signal and the clock means pulse output for incrementing the binary number and for providing a signal at a frequency based on the frequency of the pulse output from the clock means;

first memory means accessed by the processor means for being loaded thereby with a "logical" image of vertical field information for the display;

second memory means accessed by the processor means for being loaded thereby with a plurality of binary counts corresponding to the number of cycles of the clock means pulse output and for providing a corresponding binary count output;

second counter means connected to the first counter means for receiving the signal therefrom as a reference clock input and for providing an output, and connected to the first memory means for sequencing said output through memory locations of said first memory means in predetermined increments, whereby said first memory means provides output data bits containing particular vertical field information for the display;

third counter means connected to the clock means and to the second memory means, and responsive to the pulse output from the clock means and the binary count output from the second memory means for providing outputs at different times; and means connected to the clock means, the first memory means and the third counter means, and responsive to the clock means pulse output, the first memory means output data bits and the outputs at different times from the third counter means for providing the control signals in a synchronized relationship.

2. A system as described by claim 1, including:
    fourth counter means;
    counter sequencing means connected to the fourth counter means and to the first memory means and responsive to the output data bits from the first memory means for controlling the counting sequence of the fourth counter means to provide an address output; and
    the second memory means connected to the fourth counter means for being addressed by the address output therefrom.

3. A system as described by claim 2, wherein:
    the outputs at different times provided by the third counter means reach a terminal count output;
    the fourth counter means is connected to the third counter means and is responsive to the terminal count output therefrom for incrementing to an other sequential address output; and
    the second memory means is addressed by the other sequential address output.

4. A system as described by claim 3, wherein:
    the address to the second memory means provided by the address output from the fourth counter means determines the binary count output from the second memory means which is applied to the third counter means, and to which said third counter means is responsive.

5. A system as described by claim 2, wherein:

the counter sequencing means is connected to the first memory means and is connected in feedback relation to the fourth counter means, and is responsive to the output data bits from the first memory means and the address output from the fourth counter means for changing the counting sequence of the fourth counter means.

6. A system as described by claim 3, wherein:
the second counter means is connected to the first memory means and is responsive to particular output data bits from said first memory means indicating the end of an address sequence to the second memory means for being reset.

7. A system as described by claim 1, wherein:
the signal from the first counter means is fed back thereto when said signal reaches a predetermined count for reloading the first counter means to the predetermined binary number.

8. A method of providing control signals for raster scan displays by processing selected input parameters and utilizing the processed input parameters to provide the control signals comprising:
utilizing the processed input parameters for deriving a predetermined binary number from the total number of dots per horizontal period of the field of a display;
providing a pulse output in cycles at a predetermined frequency;
incrementing the predetermined binary number and providing a signal at a frequency based on the pulse output;
utilizing the processed input parameters for loading into memory a "logical" image of vertical field information for the display;
utilizing the processed input parameters for loading into memory a plurality of binary counts corresponding to the number of cycles of the pulse output;
utilizing the signal at a frequency based on the frequency of the pulse output as a reference input for providing an output, and sequencing said output through memory locations of the memory loaded with a "logical" image of vertical field information for the display in predetermined increments, whereby said memory provides output data bits containing particular vertical field information for the display;
providing outputs at different times in response to the pulse output and the plurality of binary counts loaded into memory; and
providing the control signals in a synchronized relationship in response to the pulse output, the memory data bits and the outputs at different times.

9. A method as described by claim 8, including:
responding to the data bits for controlling a counting sequence and for providing an address; and
utilizing said address for addressing the memory loaded with a plurality of binary counts corresponding to the number of cycles of the pulse output.

10. A method as described by claim 9, including:
responding to the outputs at different times when said outputs reach a terminal count for incrementing to an other sequential address; and
utilizing said other sequential address for addressing the memory loaded with a plurality of binary counts corresponding to the number of cycles of the pulse output.

11. A method as described by claim 10, including:
providing outputs at different times in response to the pulse output and in response to the plurality of binary counts loaded into memory determined by the address for addressing the memory loaded with a plurality of binary counts corresponding to the number of cycles of the pulse output.

12. A method as described by claim 9, including:
utilizing the output data bits and the address for providing an output; and
feeding back said output for changing the address.

13. A method as described by claim 10, including:
utilizing particular output data bits indicating the end of an address sequence and thereupon resetting the memory loaded with a plurality of binary counts corresponding to the number of cycles of the pulse output.

14. A method as described by claim 8, including:
feeding back the signal at a frequency based on the frequency of the pulse output when said signal reaches a predetermined count for reincrementing the predetermined binary number.

15. A system as described by claim 1, wherein:
the selected input parameters in response to which the system is accessed include vertical synchronization/frequency, the number of horizontal periods per field, the width of a horizontal back porch, the number of active pixels per horizontal period and the total number of pixels per horizontal period parameters; and
the control signals for raster scan displays include vertical blank, vertical synchronization, vertical drive, frame synchronization, composite synchronization and composite blank signals.

16. A method as described by claim 8, wherein:
the selected input parameters processed for providing control signals for raster scan displays include vertical synchronization/frequency, the number of horizontal periods per field, the width of a horizontal front porch, the width of horizontal synchronization, the width of a horizontal back porch, the number of active pixels per horizontal period and the total number of pixels per horizontal period parameters; and
the control signals for raster scan displays include vertical blank, vertical synchronization, vertical drive, frame synchronization, composite synchronization and composite blank signals.

* * * * *